(12) United States Patent
Nakano

(10) Patent No.: US 9,483,353 B2
(45) Date of Patent: Nov. 1, 2016

(54) TERMINAL DEVICE FOR DATABASE OPERATIONS

(75) Inventor: Hitoshi Nakano, Tokyo (JP)

(73) Assignee: THE BANK OF TOKYO-MITSUBISHI UFJ, LTD., Tokyo (JP)

( * ) Notice: Subject to any disclaimer, the term of this patent is extended or adjusted under 35 U.S.C. 154(b) by 778 days.

(21) Appl. No.: 13/466,299

(22) Filed: May 8, 2012

(65) Prior Publication Data

US 2012/0290538 A1    Nov. 15, 2012

(30) Foreign Application Priority Data

May 12, 2011    (JP) .................................. 2011-107510

(51) Int. Cl.
*G06F 17/30* (2006.01)
*G06F 11/14* (2006.01)

(52) U.S. Cl.
CPC .................................. *G06F 11/1443* (2013.01)

(58) Field of Classification Search
USPC ............................ 707/640, 650, 654; 705/37
See application file for complete search history.

(56) References Cited

U.S. PATENT DOCUMENTS

| | | | | |
|---|---|---|---|---|
| 5,881,381 A * | 3/1999 | Yamashita | ............ | G06F 17/246 715/209 |
| 2003/0023954 A1* | 1/2003 | Wilkinson | ............. | G06F 8/443 717/118 |
| 2007/0244571 A1* | 10/2007 | Wilson | ................ | G05B 19/042 700/11 |
| 2008/0127217 A1 | 5/2008 | Wang | | |
| 2009/0018683 A1* | 1/2009 | Gibbs | ............. | G11B 20/10527 700/94 |
| 2009/0113409 A1* | 4/2009 | Zimmer | ............ | G06F 17/30864 717/168 |
| 2010/0287114 A1* | 11/2010 | Bartko | ................... | G06Q 30/06 705/36 R |
| 2011/0082954 A1 | 4/2011 | Kim | | |
| 2011/0167042 A1* | 7/2011 | Moore, Jr. | ............. | G06Q 10/10 707/638 |
| 2012/0045121 A1* | 2/2012 | Youngman | ......... | G06Q 30/0601 382/162 |
| 2012/0078733 A1* | 3/2012 | Visinoni | ............ | G06Q 30/0277 705/14.73 |

FOREIGN PATENT DOCUMENTS

| | | |
|---|---|---|
| JP | 7-141308 A | 8/1995 |
| JP | H09-282212 A | 10/1997 |
| JP | H10-105834 A | 4/1998 |
| JP | 2790378 B2 | 8/1998 |
| JP | 11-85594 A | 3/1999 |

(Continued)

OTHER PUBLICATIONS

Office Action issued by JPO on Jan. 29, 2013, regarding JP patent application No. 2011-107510.

(Continued)

*Primary Examiner* — Hosain Alam
*Assistant Examiner* — Ahmed Abraham
(74) *Attorney, Agent, or Firm* — Typha IP LLC

(57) ABSTRACT

Provided in one embodiment of the present invention is a computer system including a database server and a terminal device for communicating with the database server; the said database server retaining a database; and the terminal device including: an interface for receiving data, which is stored in the database retained in the database server, via a communication network; a buffer for storing the data received by the interface in order to display the data in a window which is to be displayed on a display device; and a controller for starting saving the data, which is stored into the buffer, in a file at a time interval, with the window being displayed on the display device being as a trigger.

21 Claims, 9 Drawing Sheets

(56) References Cited

FOREIGN PATENT DOCUMENTS

| JP | 2000-181770 | A | | 6/2000 |
|---|---|---|---|---|
| JP | 2001-043120 | A | | 2/2001 |
| JP | 2001-290943 | A | | 10/2001 |
| JP | 2004-38419 | A | | 2/2004 |
| JP | 2004038419 | A | * | 2/2004 |
| JP | 2004-280322 | A | | 10/2004 |
| JP | 2010-075395 | A | | 4/2010 |
| JP | 2011-507100 | A | | 3/2011 |
| WO | 94/25919 | A1 | | 11/1994 |
| WO | 2009/079116 | A | | 6/2009 |

OTHER PUBLICATIONS

Shiroya Asa, "Deep Inside OS X", Mac People, Kabushiki Kaisha Ascii Media Works, Vo. 14, No. 6, Jun. 1, 2008.

* cited by examiner

| ORDER ID | CURRENCY 1 | CURRENCY 2 | SUM | RATE | PERSON-IN-CHARGE ID |
|---|---|---|---|---|---|
| 010 | USD | JPY | 0.9 | 100.00 | U345 |
| 021 | EUR | JPY | 38.0 | 110.75 | F678 |
| 035 | EUR | USD | 2.0 | 1.3350 | J901 |
| ... | ... | ... | ... | ... | ... |

(b)

| ORDER ID | CUSTOMER ID | ACCOUNT ID |
|---|---|---|
| 010 | C0123 | AB123456 |
| 021 | C0987 | ZB987654 |
| 035 | C0123 | AB123456-3 |
| ... | ... | ... |

| CURRENCY 1 | CURRENCY 2 | SUM | RATE | MARKET | |
|---|---|---|---|---|---|
| USD | JPY | 0.9 | 100.00 | 98.70 | ▨ — 501 |
| EUR | JPY | 1.0 | 109.85 | 110.01 | |
| | | | | | |

010, USD, JPY, 0.9, 100.00, C0123, AB123456,   • • •

043, EUR, JPY, 1.0, 109.85, C0987, ZB987654,   • • •

TERMINAL DEVICE FOR DATABASE OPERATIONS

CROSS REFERENCE TO RELATED APPLICATIONS

This application is based upon and claims the benefit of priority from the prior Japanese Patent Application No. 2011-107510, filed on May 12, 2011; the entire contents of which are incorporated herein by reference.

BACKGROUND OF THE INVENTION

1. Field of the Invention

The present invention relates to a terminal device, a computer readable storage having computer readable software, and the like usable for performing an operation on a database, and specifically to a terminal device, a computer readable storage having computer readable software, and the like capable of continuing processing even if a server providing the terminal device and the like with data stored in the database fails in operation.

2. Description of the Related Art

A system is widely used in which a server manacling a database provides a terminal device connected to the server via a network with data stored in the database and the terminal device makes an operation on the provided data to change the data stored in the database in the server.

When such a system is used, if the server stops operating due to a failure or the like, a business operation made on the terminal device cannot be continued anymore. In order to avoid this, another server for backup is provided separately from the server usually used, so that when a failure or the like occurs to the server usually used, the server for backup is used instead of the server usually used. With regard to such a backup technology, there are some publications such as Japanese Patent Laid-Open No. 2000-181770, Japanese Patent No. 2790378, Japanese Patent Laid-Open No. 2004-038419, Japanese Patent Laid-Open No. H07-141308, and Japanese Patent Laid-Open No. H11-085594.

In order to provide a server for backup as is conducted conventionally, a plurality of servers are required needless to say. This causes a problem that the cost for hardware is raised and another problem that the cost for software for conducting backup is raised. In addition, the server usually used and the server for backup always communicate to each other, which causes still another problem that the cost for maintenance of the communication or the like is required.

BRIEF SUMMARY OF THE INVENTION

Provided in one embodiment of the present invention is a terminal device including an interface for receiving data, which is stored in a database retained in a database server, via a communication network; a buffer for storing the data received by the interface in order to display the data in a window which is to be displayed on a display device; and a controller for starting saving the data, which is stored on the buffer, into a file at a time interval, with the window being displayed on the display device as a trigger.

Provided in one embodiment of the present invention is a computer system including a database server and a terminal device for communicating with the database server; the said database server retaining a database; and the terminal device including: an interface for receiving data, which is stored in the database retained in the database server, via a communication network; a buffer for storing the data received by the interface in order to display the data in a window which is to be displayed on a display device; and a controller for starting saving the data, which is stored into the buffer, in a file at a time interval, with the window being displayed on the display device as a trigger.

Provided in one embodiment of the present invention is tangible computer readable storage having computer readable software embodied thereon for causing a computer to receive data, stored in a database retained in a database server connected to the computer via a communication network, the data being received by an interface of the computer via the communication network connected to the computer; store the data received by the interface on a buffer in order to display the data in a window which is to be displayed on a display device connected to the computer; and start saving the data, which is stored on the buffer, in a file at a time interval, with the window being displayed on the display device as a trigger.

BRIEF DESCRIPTION OF DRAWINGS

FIG. 3 shows examples of tables for managing data in a database server according to an embodiment of the present invention.

FIG. 5 shows an example of a window displayed on a terminal device according to an embodiment of the present invention, FIG. 8 shows an example of data in a file stored in a terminal device according to an embodiment of the present invention.

DESCRIPTION OF EMBODIMENTS

Embodiments of the present invention are described below. The present invention is not limited to the embodiments described below, and may be carried out in any of various changes and modifications made to the embodiments described below.

Figure 1:
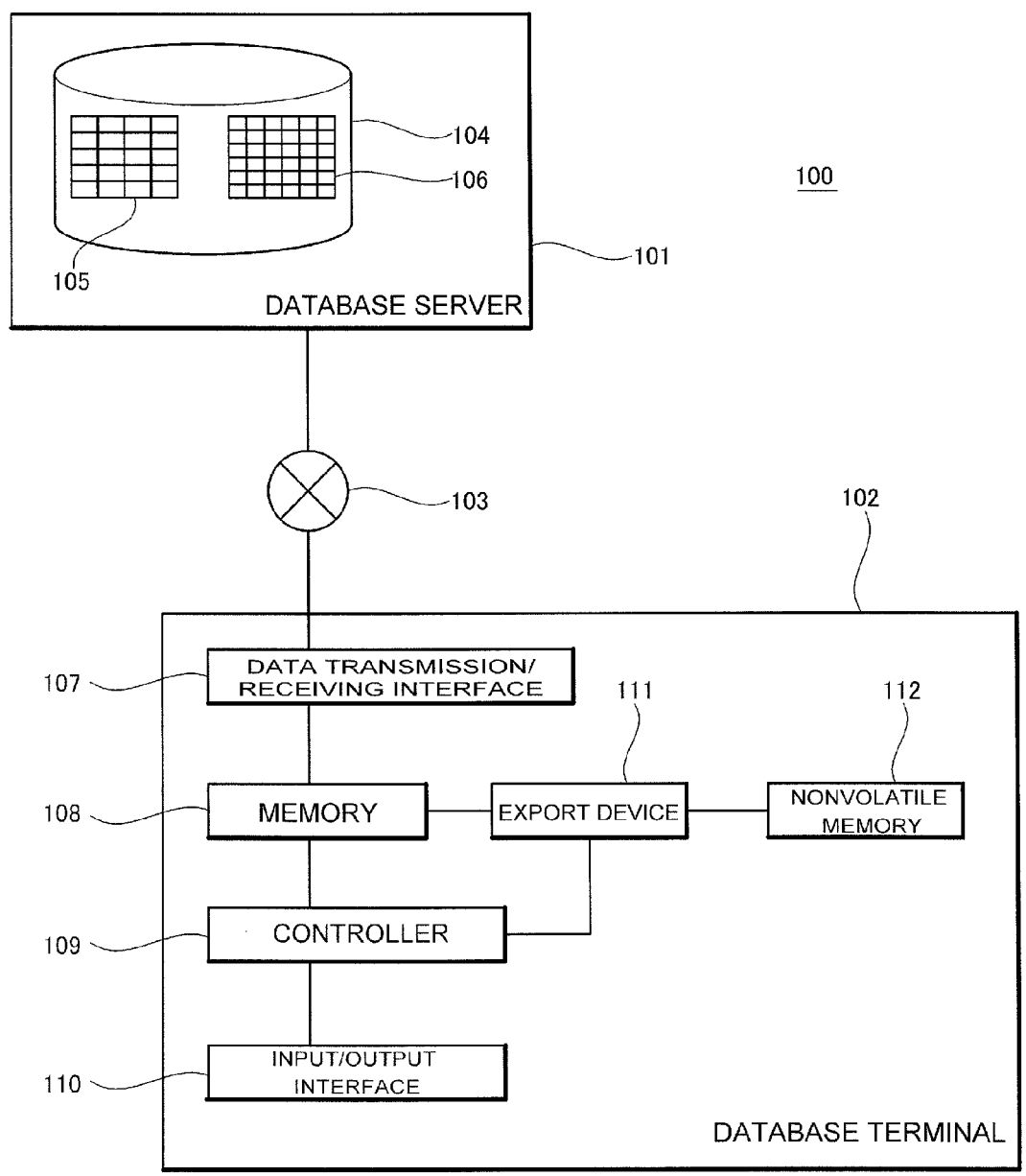
FIG. 1 is a functional block diagram of a system according to an embodiment of the present invention.

FIG. 1 is a functional block diagram of a system according to an embodiment of the present invention. A system 100 includes a database server 101 and a database terminal device 102. The database server 101 and the database terminal device 102 are connected to each other by a communication network 103. In FIG. 1, one database server and one database terminal device are shown. In the present embodiment, however, the system 100 may include a plurality of database servers and a plurality of database terminal devices. The system 100 may include a server other than the database server 101, and the system 100 also may include a terminal device other than the database terminal device 102.

The database server 101 may be one type of a computer. The database server 101 includes a storage device 104. The storage device 104 stores a database by use of a hard disk, a memory, etc. The database has data stored therein. In FIG. 1, data stored in the database is retained in a table 105, 106, etc. in table formats. As can be seen, in the example shown in FIG. 1, data is stored by use of a relational database. However, the present embodiment is not limited to using a relational database. For example, a database of any of various other data models such as a network structure database, a hierarchical database or the like may be used.

The database terminal device 102 is a terminal device for receiving data, which is stored in a database which is retained in the storage device 104 of the database server 101, via the communication network 103, displaying the data on a display device, and/or changing data through data operations. The database terminal device 102 includes an input/output interface 110, a data transmission/receiving interface 107, a controller 109, a memory 108, an export device 111, and a nonvolatile memory 112.

The input/output interface 110 provides an interface for allowing an operator of the database terminal device 102 to display, and/or make an operation art data stored in a database which is retained in the storage device 104 of the database server 101. For example, the input/output interface 110 is connected to a display device, a keyboard, a mouse or the like. The input/output interface 110 displays, on the display device, a database operation screen for allowing the operator to display, and/or make an operation on the data stored in the database; reads information input through the keyboard or detects an operation made by use of the mouse; and transmits the information or the operation to the controller 109. The database operation screen does not need to correspond, in a one-to-one manner, to a screen of the display device connected to the input/output interface 110, and may be displayed as a window in a multi-window environment.

The data transmission/receiving interface 107 performs an information communication with the database server 101 in accordance with, for example, the operation detected via the input/output interface 101. Namely, the data transmission/receiving interface 107 transmits a data transmission request for data, which is stored in a database which is retained in the storage device 104 of the database server 101, to the database server 101 via the communication network 103 in accordance with, for example, the operation detected via the input/output interface 110. Also, the data transmission/receiving interface 107 receives data transmitted in response to the data transmission request and stores the received data in the memory 108.

The data transmission/receiving interface 107 transmits the data stored in the memory 108 to the database server 101 in accordance with, for example, the operation detected via the input/output interface 110, and transmits a request for a database update. "Change of a database" includes (1) an insertion of data into a database retained in the storage device 104 of the database server 101, (2) an update of data stored in such a database, and (3) a deletion of the data from such a database. As a result of an insertion of data, a new row is added to a database table. As a result of an update of data, the information stored in a row or a column stored in the database table is changed. As a result of a deletion of data, a row is deleted from a database table. "Change of a database" may also include managing operations such as (4) a creation of a database table, (5) a drop of a database table, (6) an alternation of a database table, and (7) a change of an access privilege of a database table.

The memory 108 stores the data received by the data transmission/receiving interface 107. Specifically, the memory 108 includes a buffer for storing data in order to display the data on the database operation screen. Thus, in order to display data, which is stored in a database which is retained in the storage device 104 of the database server 101, on the database operation screen, the data is received by the data transmission/receiving interface 107 from the database server 101 via the communication network 103 and stored in the buffer. The data to be stored in the buffer is not limited to the data which is about to be displayed on the database operation screen. The buffer may store data which is not about to be displayed on the database operation screen but is to be newly displayed by an operation such as scrolling of a screen or the like. Namely, the data to be newly displayed by an operation such as scrolling of a screen or the like may be received in advance (in other words, the data may be read in advance) and stored. Owing to this, smooth scrolling of a screen or the like is realized.

The memory 108 stores information input to the database operation screen by use of, for example, a keyboard connected to the input/output interface 110. The information thus stored is used to change data stored in a database which is retained on the storage section 104 of the database server 101. For example, the information input to the database operation screen is stored in the memory 108 as data to be inserted into a database table. Alternatively, the information changed on the database operation screen is stored in the memory 108 as data used for updating the current data. The information specifying the data which is displayed on the database operation screen and on which the mouse or the like is clicked is stored in the memory 108 as information specifying the data to be deleted from the database table. These pieces of information may be stored in the buffer described above.

The memory 108 mainly includes a nonvolatile memory. In the case where, for example, a virtual storage is used, the memory 108 may include a storage area of a nonvolatile storage device such as a hard disk or the like.

The nonvolatile memory 112 can keep the stored data even when the power supply of the database terminal device 102 is cut off, and can be realized by, for example, a hard disk drive, a solid-state drive or the like. In order to improve the efficiency of input/output to/from the hard disk drive, the solid-state drive or the like, a part of the nonvolatile memory 112 may be a volatile memory to which information may be cached.

The export device 111 transfers the data stored in the memory 108 to the nonvolatile memory 112. The transferred data are saved in the nonvolatile memory 112. When saved in the nonvolatile memory 112, the data may be transformed into a format different from the format the data is stored in the memory 112. The export device 111 does not need to transfer all the data stored in the memory 108 to the nonvolatile memory 112 for storage. For example, the export device 111 may transfer only the data stored in the buffer to the nonvolatile memory 112 for storage. When the export device 111 transfers the data stored in the memory 108 to the nonvolatile memory 112 for storage, it is preferable that the data is saved in a general format such as a text or the like, instead of binary. It is especially preferable that the data is saved in the CSV (Comma Separated Values) format, in which each datum is separated by a comma and the end of a series of data is represented by a line break. Owing to this, even if the database server 101 fails in operation, an operation can be continued by using the data stored in the nonvolatile memory 112 with a general application such as a spreadsheet application or the like, which has been installed in the database terminal 102 device or is accessible from the database terminal device 102 via the communication network, etc., and thus the business operation can be continued.

As described later, the export device 111 is activated when the controller 109 determines that a predetermined condition is fulfilled.

The controller 109 controls each device and each part of the database terminal device 102. For example, the controller 109 detects an operation made by the operator of the database terminal device 102 via the input/output interface 110 and performs a control in accordance therewith. Specifically, when it is determined that data stored in a database which is retained in the storage device 104 of the database server 101 is required, the controller 109 controls the data transmission/receiving interface 107 to transmit a data transmission request to the database server 101, and then stores the data transmitted from the database server 101 in response to the data transmission request in the memory 108. An example of the case when it is determined that data stored in a database which is retained on the storage section 104 of the database server 101 is required is when the operator of the database terminal 102 has made an operation of searching for data.

The controller 109 also displays the data, which is stored in the buffer, on the database operation screen of the display device, which is connected to the input/output interface 110, When it is detected by the input/output interface 110 that an operation has been made on the data displayed in the window or the like of the display device, the controller 109 changes the data stored in the memory 108 and controls the data transmission/receiving interface 107 to transmit a data change request.

When determining that a predetermined condition is fulfilled, the controller 109 activates the export device 111. The predetermined condition is, for example, (1) a condition regarding an operation which can be detected by the input/output interface 110; (2) a prescribed condition regarding data stored on the memory 108; (3) a condition regarding the elapse of time, (4) a condition regarding data received by the data transmission/receiving interface via the communication network 103, etc. More specifically, the predetermined condition is, for example, as follows: it is detected by the input/output interface 110 that an operation of displaying the database operation screen on the display device has been made by the mouse or the like; the database operation screen is displayed on the display device, and data transmitted in response to a data transmission request for data saved in a database which is stored in the storage device 104 of the database server 101 has been stored in the buffer of the memory 108; a prescribed time, for example, five minutes, has elapsed after the database operation screen is displayed on the display device; or another prescribed time has elapsed after the prescribed time elapsed.

Figure 2:
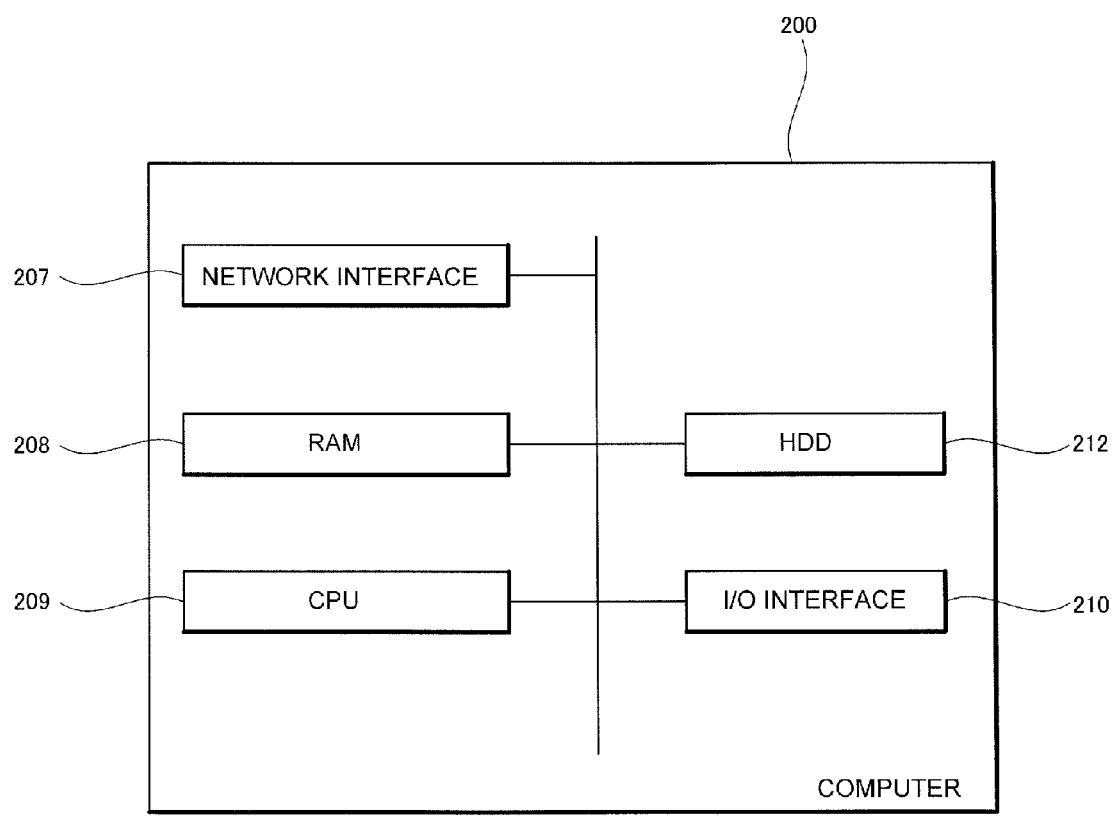
FIG. 2 is a functional block diagram of a computer which is an example of a terminal device according to an embodiment of the present invention.

The database terminal device 102 having the above-described configuration may alternatively be realized by a computer having a functional block shown in FIG. 2. With reference to FIG. 2, a computer 200 includes a network interface 207, a RAM 208, a CPU 209, an HDD 212, and an I/O interface 210. The network interface 207 corresponds to the data transmission/receiving interface 107, and is hardware for transmitting and receiving data via the communication network 103. The RAM 208 corresponds to the memory 108, and temporarily stores data. The CPU 209 corresponds to a combination of the controller 109 and the export device 111, and executes a program to control the network interface 207, the RAM 208, the HDD 212, and the I/O interface 210. The HDD 212 corresponds to the nonvolatile memory 112, and is hardware realized by a hard disk drive or the like. The I/O interface 210 corresponds to the input/output interface 110, and is hardware for controlling the mouse, the keyboard, and the display device. The HDD 212 may be realized by a solid-state drive, an optical disk drive or the like.

Figure 4:
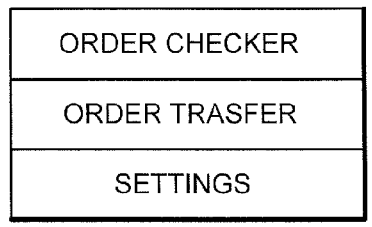
FIG. 4 shows examples of windows displayed on a terminal device according to an embodiment of the present invention.
Figure 4:
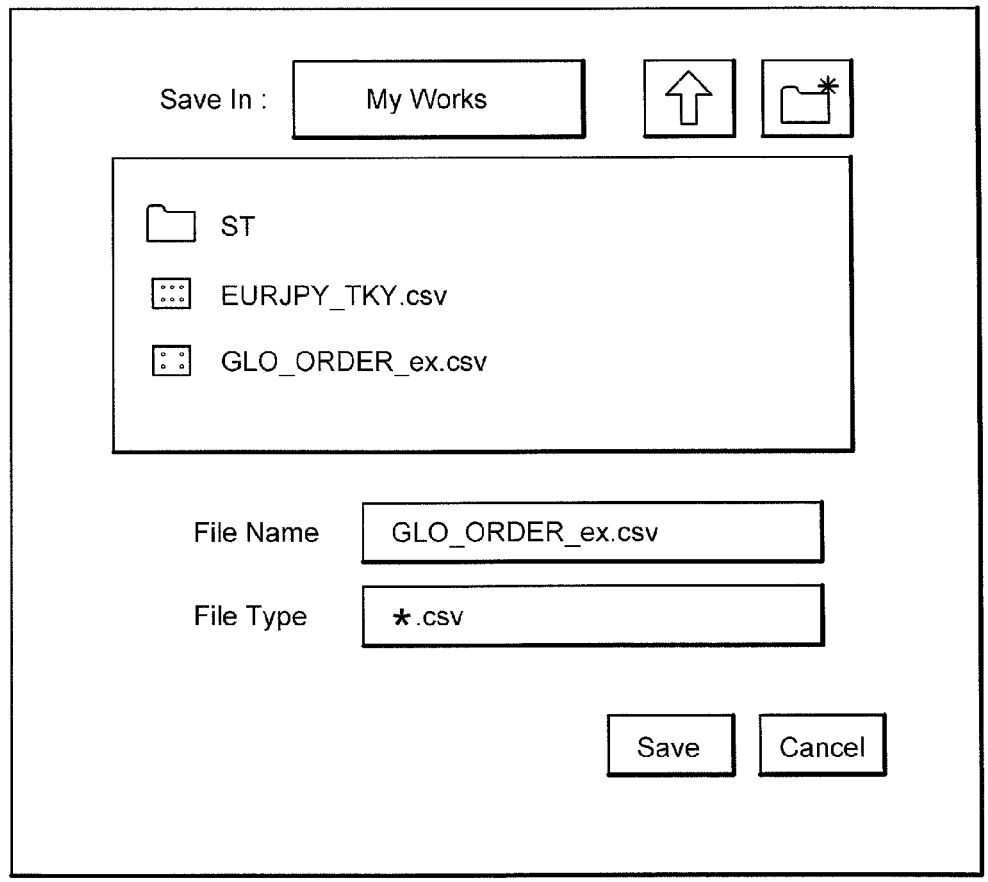

With reference to FIG. 3 FIG. 4, and FIG. 5, an example in which the system according to the present embodiment is used for a foreign exchange transaction in a bank operation is used is described.

FIG. 3 shows examples of data stored in a database which is retained in the storage device 104 of the database server 101. FIG. 3(a) shows an example of a table in which data regarding buy offers for currencies of limit orders is stored. This table includes columns of "ORDER ID", "CURRENCY 1", "CURRENCY 2", "SUM", "RATE", and "PERSON-IN-CHARGE ID." Stored in these columns are, respectively, information identifying the orders, the currency units as the targets of buy, the currency units used for the settlement to buy currency 1, the quantities of the currencies as the targets of buy, the prices of limit orders, and information identifying the persons in charge who process the orders. For example, in the row having 010 in the column of the ORDER ID, data which indicates that a buy offer for 0.9 units of the US dollars (USD) has been made with the Japanese yen (JPY) being used for the settlement of a limit order at 100.00 yen a US dollar and that this buy offer is to be processed by the person identified as U345 is saved.

FIG. 3(b) shows an example of a table in which information on the customers who have placed the orders is stored. This table includes columns of "ORDER ID", "CUSTOMER ID", and "ACCOUNT ID". Stored in these columns are, respectively, information identifying the orders, information identifying the customers who have placed the orders, and information identifying the accounts from which the settlement will be made. For example, it is indicated that the order identified as 010 has been made by the customer identified as C0123 and having the account identified as AB123456. It is also indicated that the customer identified as C0123 has also placed the order identified as 035.

FIG. 4 and FIG. 5 show examples of windows of the display device connected to the input/output interface 110 of the database terminal device 102.

FIG. 4(a) shows an example of a window which is displayed after a person has logged in on the database terminal device 102 for processing orders. This example shows an application launcher window, and allows any of three types of applications corresponding to "ORDER CHECKER", "ORDER TRANSFER", and "SETTINGS" to be activated. "ORDER CHECKER" corresponds to, for example, an application for processing a buy offer for a currency of a limit order. "ORDER TRANSFER" corresponds to, for example, an application for reflecting, on the database, the results of operations made by a spreadsheet application on the data stored in the nonvolatile memory 112. "SETTINGS" corresponds to, for example, an application for making environmental settings for "ORDER CHECKER" and "ORDER TRANSFER."

FIG. 4(b) shows an example of a window displayed by the application which is activated when "SETTINGS" is selected from the applications shown in FIG. 4(a). FIG. 4(b) shows an example of a window used to set a file name, a folder or a directory used for executing processing by the export device 111. To the right of "Save in:", "My Works" is shown as a folder name or a directory name in a file system constructed on the nonvolatile memory 112. In the sub window therebelow, a folder or a directory and files in "My Works" are shown. Below the sub window, to the right of "File Name:", "GLO_ORDER_ex.csv" has been input. In this case, "GLO_ORDER_ex.csv" is the file name by which the data stored in the memory 108 is exported and stored by the export device 111.

FIG. 5 shows an example of a window in which the database operation screen is displayed by the application activated when "ORDER CHECKER" is selected. This application, when being activated, requests the database server 101 to search for data which has, in the "PERSON-IN-CHARGE ID" column, the identification information of the operator who has logged in on the database terminal device 102, among the data stored in the table shown in FIG. 3(a). Then, the application stores data regarding the buy offers of limit order, received as a response to this request, in the buffer of the memory 108.

Alternatively, this application may transmit a transmission request for customer data regarding the customer who has made the buy offer of a limit order stored in the buffer, among the customers shown in the table shown in FIG. 3(b), and then store the customer data, transmitted in response, in the buffer or the like of the memory 108. The requested customer data includes an order ID included in the data regarding the buy offer of a limit order stored in the buffer. For example, when the identification information of the operator who has loped in on the database terminal device 102 is U345, data having the order ID of 010 is stored in the memory 108 based on FIG. 3(a). Therefore, based on the table shown in FIG. 3(b), a request for the second data having the customer ID of C0123 and the account ID of AB123456 is transmitted from the database terminal 102 to the database server 101. Accordingly, a request for searching for the data having the order ID of 010, which is stored in the buffer of the memory 108, against the table shown in FIG. 3(b) is transmitted from the database terminal device 102 to the database server 101 via the data transmission/receiving interface 107.

Referring to the table shown in FIG. 3(a), the ID of the person in charge of the order data having the order ID of 021 is F678. Therefore, there is no need to request a search for the data having the customer ID of C0987 and the account ID of ZB987654. Owing to this, the amount of data to be stored on the memory 108 and the nonvolatile memory 112 can be reduced.

A part of the data, which is stored in the table shown in FIG. 3(a), is displayed in a window shown in FIG. 5. The expression that a "part of the data is displayed" has the following two meanings. A first meaning is that among the data stored in the table shown in FIG. 3(a), the data having, in the "PERSON-IN-CHAGE ID" column, the identification information of the operator who has logged in on the database terminal device 102 is displayed. A second meaning is that among the data having, in the "PERSON-IN-CHAGE ID" column, the identification information of the operator who has logged in on the database terminal device 102, information stored in the columns of "currency 1", "currency 2", "sum" and "rate" is displayed.

In order to provide such a display, it is preferable that a part of the data saved in the table shown in FIG. 3(a) is stored in the buffer. By a part, of the data stored in the table shown in FIG. 3(a) being stored in the buffer, the size of the storage area assigned to the buffer can be reduced.

As described above, among the data saved in the table shown in FIG. 3(a), the data associated with the identification information of the operator of the database terminal device 102 is stored in the buffer. Alternatively, in the case where an operator is defined for each currency to be handled, among the data saved in the table shown in FIG. 3(a), the data regarding a specific currency may be stored in the buffer.

In FIG. 5, a column of "MARKET" is displayed. In this column, the current rates on the foreign exchange markets are shown. The information on the current exchange rates may be received from the database server 101 or from another server not shown in the drawing via the communication network 103 or the like. The operator of the database terminal 102 compares a value in the column of the "RATE" against the value in the column of the "MARKET" in a line of the same buy offer. When it is appropriate to process the order, the operator, for example, clicks the mouse to process the order. For example, as shown in FIG. 5, a buy offer of a limit order of 100.00 yen a US dollar is displayed, and the current exchange rate on the market is 98.70. Therefore, the operator processes this order. Information indicating that the order has been processed is transmitted from the database terminal device 102 to the database server 101 and recorded therein.

In the present embodiment, the data displayed in the window shown in FIG. 5 is saved in the nonvolatile memory 112 by the export device 111. Specifically, the data is saved in the folder or the directory and the files of the names specified in FIG. 4(b). In this case, in addition to the data actually displayed in the window, data which is not displayed in the window but is stored in the buffer of the memory 108 and will be displayed when a scroll bar 501 is operated may also be saved on the nonvolatile memory 112 by the export device 111.

The export device 111 may save the data in the nonvolatile memory 112 at a time interval. For example, after the window of FIG. 5 is displayed, the export device 111 saves data in the nonvolatile memory 112 regularly, for example, every five minutes. In order to realize this, while the window of the database operation screen is displayed, the controller 109 keeps a timer on and detects an elapse of five minutes. Five minutes is an example, and any length of time can be selected. Alternatively, the time length may be varied in accordance with the fluctuation of the exchange rate on the market, which may be received via the communication network 103 or the like. For example, when the exchange rate fluctuates more frequently on the market, a shorter length of time may be selected; whereas when the exchange rate fluctuates more slowly on the market, a longer length of time may be selected. In this manner, the time interval at which the data is saved in the nonvolatile memory 112 may be adjusted. The adjustment of the time interval may be automatically executed by the database terminal device 102. Alternatively, a shorter length of time may be selected as the range of fluctuation of the exchange rate is larger.

Figure 6:
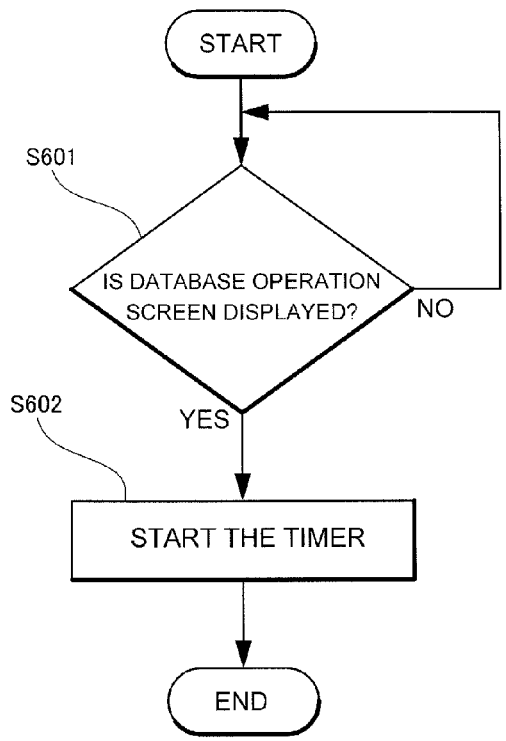
FIG. 6 shows flowcharts illustrating processing executed by a terminal device according to an embodiment of the present invention.
Figure 6:
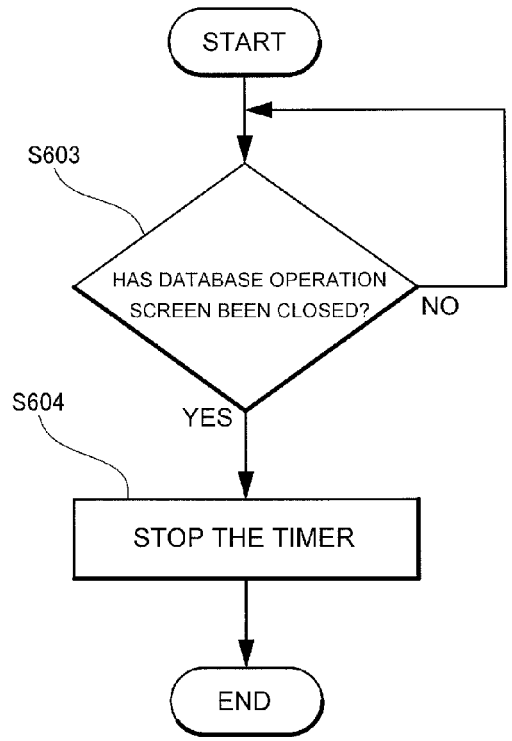

FIG. 6 shows examples of flowcharts of processing which is executed by the database terminal device 102 according to this embodiment. The flowchart shown in FIG. 6(a) shows the processing executed until the database operation screen is displayed. The flowchart shown in FIG. 6(b) shows the processing executed after the database operation screen is displayed until the database operation screen is closed (until the database operation screen is made non-displayed).

Referring to the flowchart shown in FIG. 6(a), in step S601, it is determined whether the database operation screen has been displayed or not. When the database operation screen has not been displayed, the database terminal 102 waits until the database operation screen is displayed. When the database operation screen is displayed, the database terminal 102 advances the processing to step S602, where the timer is activated. The timer notifies the controller 109 and the CPU 209 that a prescribed length of time has elapsed. When it is notified that the prescribed length of time has elapsed, processing in step S702 in a flowchart shown in FIG. 7 is executed; namely, the export device 111 is activated by the controller 109 each time when the prescribed length of time has elapsed, namely, regularly.

Referring to the flowchart shown in FIG. 6(b), in step S603, it is determined whether the database operation screen has been closed or not. When the database operation screen has not been closed, the database terminal 102 waits until the database operation screen is closed. When the database operation screen is closed, the database terminal 102 advances the processing to step S604, where the timer is stopped. When this occurs, the export device 111 is set to a non-active state, and the data stored in the memory 108 is not saved in the nonvolatile memory 112. The closure of the database operation screen means that no operation on the database is performed. Even if database server 101 fails while the database operation screen is closed, there is no influence of the failure. Therefore, while the database operation screen is closed, it would be wasteful to operate the export device 111. Thus, no wasteful processing is executed on the database terminal 102.

Figure 7:
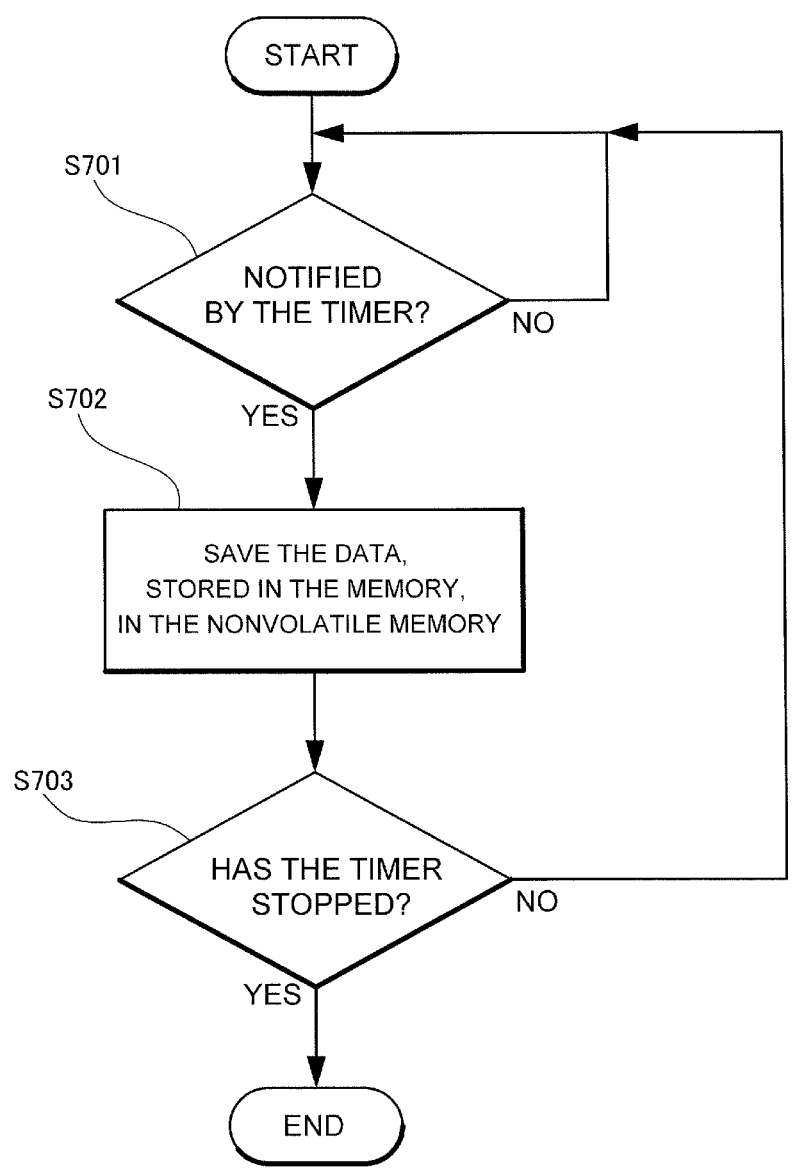
FIG. 7 is a flowchart illustrating processing executed by a terminal device according to an embodiment of the present invention.

FIG. 7 shows an example of a flowchart of processing executed by the export device 111. In S701, the export device 111 waits until it is notified by the timer that the prescribed length of time has elapsed. After the elapse of the prescribed length of time, the export device 111 advances the processing to step S702, where the data stored in the memory 108 is saved in the nonvolatile memory 112. Then, the export device 111 advances the processing to step S703, where it is determined whether the timer has stopped or not. When the timer has not stopped, the export device 111 returns the processing to step S701 and the above-described processing is repeated.

FIG. 8 shows an example of data saved in the nonvolatile memory 112 in step S702. In this example, data which correspond to the data displayed on the database operation screen shown in FIG. 5 and which are stored in the table shown in FIG. 3(a) are saved. In addition, among the data stored in the table shown in FIG. 3(b), the data associated with the data stored in the table shown in FIG. 3(a) by the order ID is saved. Both of the data is saved in the CSV format. Even if the database server 101 stops operation due to a failure the like, the operator of the database terminal device 102 can allow such data saved in the CSV format to be shown on the screen by, for example, a spreadsheet application or the like and thus continues the business operation by use of the spreadsheet application or the like. For example, the operator enters the information that a buy offer of a limit order has been processed and the exchange rate on the market at the time of the processing. When the database server 101 is recovered, the operator can upload the entered data to the database server 101.

Figure 9:
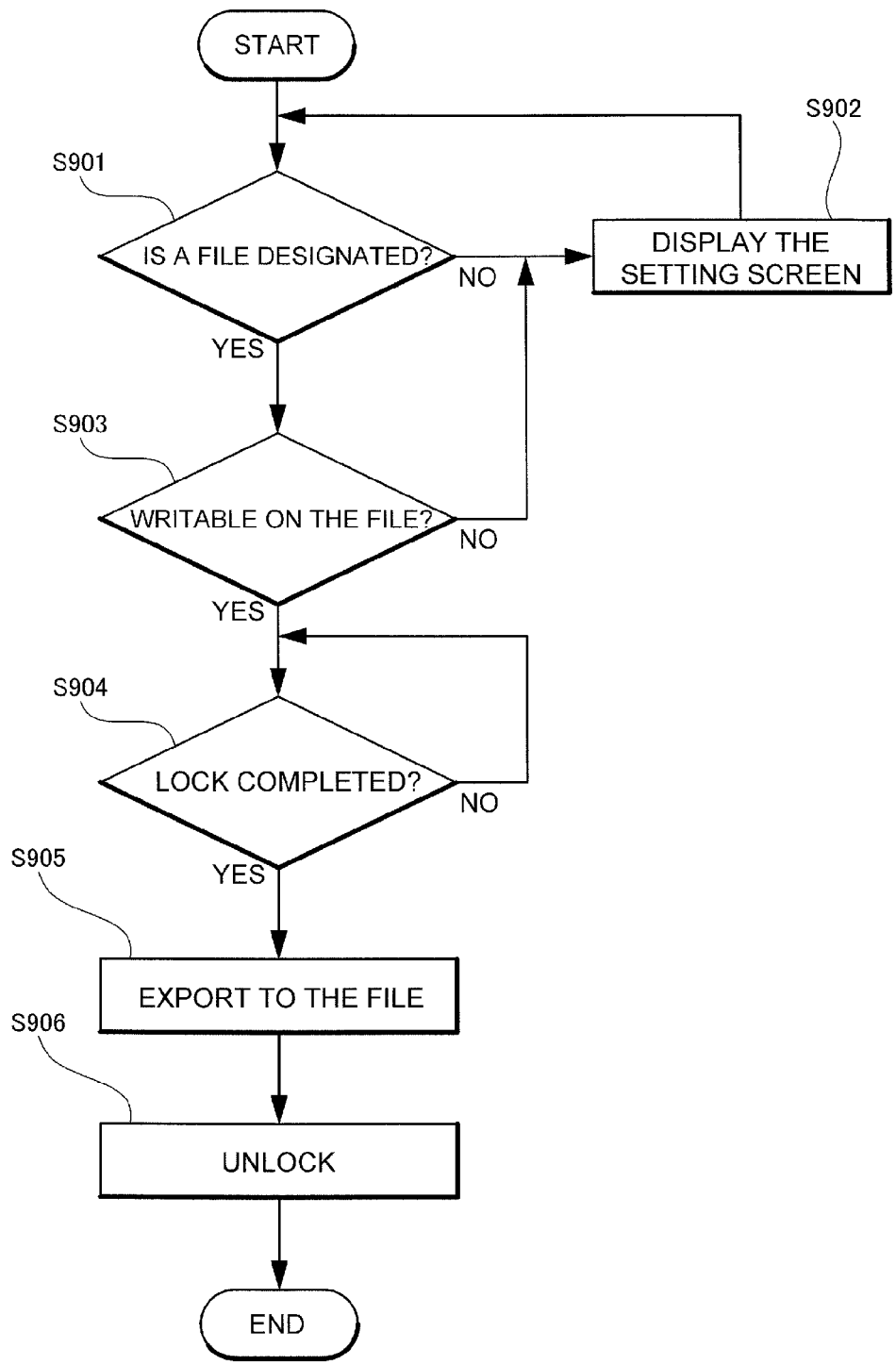
FIG. 9 is a flowchart illustrating processing executed by a terminal device according to an embodiment of the present invention.

FIG. 9 shows an example of a flowchart illustrating the processing in step S701 in detail. In step S901, it is determined whether a file has been designated or not. When no file has been designated, the export device 111 advances the processing to step S902, where the setting screen shown in FIG. 4(b) is displayed. When a file is designated, the export device 111 advances the processing to step S903, where it is determined whether data is writable on the designated file or not. For example, it is determined whether the export device 111 is authorized to write data on the designated file or not. When data is not writable on the designated file, the export device 111 advances the processing to step S902. When data is writable on the designated file, the export device 111 advances the processing to step S904, where it is determined whether data lock has been completed.

The data lock is made in order to prevent the operator from changing the data stored in the memory 108, or from storing the data, received by the data transmission/receiving interface 107 from the database server 101, on the memory 108, while the export device 111 is reading the data from the memory 108. Namely, exclusive control on reading of data by the export device 111 from the memory 108 and changing of the data stored in the memory 108 is realized.

When the data lock is completed, in step S905, export is performed. When the export is completed, in step S906, the data locked in step S904 is unlocked. The unlock allows the data stored in the memory 108 to be changed.

In the above, an example in which the system according to this embodiment is used for processing a foreign exchange transaction in a bank operation has been mainly described. The system according to this embodiment is usable for various business operations using a database. For example, the system according to this embodiment is usable for managing order receipts of products, managing in libraries, managing electronic records of patients, and the like.

What is claimed is:

1. A terminal device, comprising:
an interface configured to receive, via a communication network, data from a database server;
a buffer configured to temporarily store the data received by the interface in order to display the data on a display device; and
a controller configured to cause initiation of saving the data stored in the buffer to a non-volatile memory at predetermined time intervals, in response to a determination that the data stored in the buffer is displayed on the display device.

2. The terminal device according to claim 1, wherein the buffer stores a part of the data stored in the database server.

3. The terminal device according to claim 2, wherein:
the data stored in the database server is associated with an identification number of an operator of the terminal device; and
the buffer stores data which is associated with the identification number of the operator of the terminal device, among the part of the data stored in the database server.

4. The terminal device according to claim 1, wherein when a display window of the display device is closed, the controller further causes to cessation of saving the data to the non-volatile memory.

5. The terminal device according to claim 1, wherein before saving the data the controller further causes to lock the data stored in the buffer to perform exclusive control on an operation of changing the data.

6. The terminal device according to claim 1, wherein the controller further causes to repeatedly save the data at the predetermined intervals.

7. The terminal device according to claim 1, wherein the data saved in the database server represents a buy offer of foreign exchange of a limit order, and the controller further causes to adjust the predetermined time interval in accordance with a rate fluctuation degree of the foreign exchange.

8. The terminal device according to claim 7, wherein the rate fluctuation degree the foreign exchange is received via the communication network.

9. The terminal device according to claim 1, wherein the data stored in the buffer is saved in a CSV format.

10. The terminal device according to claim 1, wherein the data saved in the buffer is manipulated by an application which is installed in the terminal device or is accessible from the terminal device.

11. A computer system comprising
a database server and
a terminal device for communicating with the database server;
the terminal device comprising:
an interface configured to receive, via a communication network, data from the database server;
a buffer configured to temporarily store the data received by the interface in order to display the data on a display device; and
a controller configured to cause initiation of saving the data stored in the buffer to a non-volatile memory at predetermined time intervals, in response to a determination that the data stored in the buffer is displayed on the display device.

12. The computer system according to claim 11, wherein the buffer stores a part of the data stored in the database server.

13. The computer system according to claim 12, wherein:
the data stored in the database server is associated with an identification number of an operator of the terminal device; and
the buffer stores data which is associated with the identification number of the operator of the terminal device, among the part of the data stored in the database server.

14. The computer system according to claim 11, wherein when a display window of the display device is closed, the controller further causes to cessation of saving the data to the non-volatile memory.

15. The computer system according to claim 11, wherein before saving the data the controller further causes to lock the data stored on the buffer to perform exclusive control on an operation of changing the data.

16. Non-transitory computer readable storage medium having stored therein computer executable instructions for causing a computer to:

receive, by an interface, via a communication network, data from a database server;
temporarily store, by a buffer, the data received by the interface in order to display the data on a display device; and
cause initiation of saving the data stored in the buffer to a non-volatile memory at predetermined time intervals, in response to a determination that the data stored in the buffer is displayed on the display device.

17. The non-transitory computer readable storage medium according to claim 16, wherein the buffer stores a part of the data stored in the database server.

18. The non-transitory computer readable storage medium according to claim 17,
wherein:
the data stored in the database server is associated with an identification number of an operator of the terminal device; and
the buffer stores data which is associated with the identification number of the operator of the terminal device, among the part of the data stored in the database server.

19. The non-transitory computer readable storage medium according to claim 16, wherein when a display window of the display device is closed, the controller further causes to cessation of saving the data to the non-volatile memory.

20. The non-transitory computer readable storage medium according to claim 16, wherein before saving the data the controller further causes to lock the data stored on the buffer to perform exclusive control on an operation of changing the data.

21. A method for saving data comprising:
receiving, by an interface, via a communication network, data from a database server;
temporarily storing, by a buffer, the data received by the interface in order to display the data on a display device; and
causing initiation of saving the data stored in the buffer to a non-volatile memory at predetermined time intervals, in response to a determination that the data stored in the buffer is displayed on the display device.

* * * * *